United States Patent
Knight

(10) Patent No.: US 10,771,499 B2
(45) Date of Patent: Sep. 8, 2020

(54) AUTOMATIC HANDLING OF DEVICE GROUP OVERSUBSCRIPTION USING STATELESS UPSTREAM NETWORK DEVICES

(71) Applicant: Arbor Networks, Inc., Burlington, MA (US)

(72) Inventor: Joshua Graham Knight, Farmington Hills, MI (US)

(73) Assignee: Arbor Networks, Inc., Westford, MA (US)

( * ) Notice: Subject to any disclaimer, the term of this patent is extended or adjusted under 35 U.S.C. 154(b) by 227 days.

(21) Appl. No.: 15/616,757

(22) Filed: Jun. 7, 2017

(65) Prior Publication Data
US 2018/0359279 A1    Dec. 13, 2018

(51) Int. Cl.
*H04L 29/06* (2006.01)
*H04L 12/24* (2006.01)
*H04L 12/26* (2006.01)

(52) U.S. Cl.
CPC ...... *H04L 63/1458* (2013.01); *H04L 41/0893* (2013.01); *H04L 43/028* (2013.01); *H04L 63/0218* (2013.01); *H04L 63/20* (2013.01); *H04L 2463/141* (2013.01)

(58) Field of Classification Search
CPC ............. H04L 63/1458; H04L 63/1408; H04L 63/1416; H04L 63/1441; H04L 41/0893; H04L 63/20

USPC ............................................................ 726/1
See application file for complete search history.

(56) References Cited

U.S. PATENT DOCUMENTS

| | | | |
|---|---|---|---|
| 8,009,559 B1* | 8/2011 | Turk | H04L 63/1416 370/216 |
| 2010/0220588 A1* | 9/2010 | Plamondon | H04L 1/0025 370/230 |
| 2013/0333029 A1* | 12/2013 | Chesla | H04L 45/74 726/22 |
| 2016/0269362 A1* | 9/2016 | Rolette | H04L 63/20 |
| 2017/0289047 A1* | 10/2017 | Szilagyi | H04L 41/0853 |
| 2018/0234454 A1* | 8/2018 | Aggarwal | H04L 63/1458 |
| 2019/0268232 A1* | 8/2019 | Garcia Azorero | H04M 15/66 |

* cited by examiner

*Primary Examiner* — Haresh N Patel
(74) *Attorney, Agent, or Firm* — Locke Lord LLP; Scott D. Wofsy; Christopher J. Capelli

(57) ABSTRACT

A DDoS attack mitigation system includes a plurality of stateless network devices connected to a network. The system also includes one or more DPI devices connected to the plurality of stateless devices. The system further includes a controller connected to the plurality of stateless devices and connected to the DPI devices. The controller includes logic integrated with and/or executable by a processor. The controller is configured to receive a signal from a first DPI device and analyze the received signal. The controller is further configured to update a network traffic policy to redirect at least some of network traffic destined for the first DPI device to one or more DPI devices different from the first DPI device based on the analyzed signal and to send a signal indicative of the updated network policy to at least some of the plurality of stateless devices.

17 Claims, 3 Drawing Sheets

AUTOMATIC HANDLING OF DEVICE GROUP OVERSUBSCRIPTION USING STATELESS UPSTREAM NETWORK DEVICES

FIELD OF THE INVENTION

Embodiments of the present invention relate generally to methods and systems for malware detection and mitigation, and specifically to automatic handling of device group oversubscription using stateless upstream network devices.

BACKGROUND OF THE INVENTION

Attacks, such as attacks utilizing flooding, denial of service, distributed denial of service (DDoS), viruses, worms, trojan horses, rogue applications, malware, exploits, spam, phishing, etc., are becoming an ever-increasing problem in today's Internet. For example, by sending large amounts of malicious packets, denial of service attacks can cause consumption and/or overload of scarce, limited, and/or non-renewable system and/or network resources, such as bandwidth, disk space, CPU time, and/or allocations thereof; destruction and/or alteration of configuration information, such as routing information; disruption of normal operating system functionality; and/or physical destruction and/or alteration of network components, etc.

The deep packet inspection (DPI) technology, as a core technology for network intrusion detection and application protocol identification, plays an increasingly important role in the field of network and information security. The DPI technology implements deep analysis on a data packet using a feature matching algorithm to obtain application information of the data packet so as to implement services such as network optimization, application traffic control, and security detection. A collection of DPI devices can act in unison to protect networks from bulk attacks, such as DDoS, where host server devices can get overwhelmed by too many requests that flood their capacity resulting in the severing of requests from legitimate host client devices to either be slow or not resolve at all. Typical existing load balancing implementations are static and require an operator to manually partition available load balancing devices.

As such, a new, scalable, and automatic load balancing approach with inherent intelligence is desirable. Such an automated approach should enable full utilization of DDoS scrubbing capacity and allow seamless DPI device addition and/or removal to/from the device group.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for automatic handling of device group oversubscription includes receiving, by a controller, a signal from a first DPI device of the one or more DPI devices. The controller is connected to one or more of a plurality of stateless network devices and connected to the one or more DPI devices. The signal received from the first DPI device is analyzed by the controller. A network traffic policy is updated, by the controller, to redirect at least some of network traffic destined for the first DPI device to the one or more DPI devices different from the first DPI device based on the analyzed signal. A signal indicative of the updated network policy is sent by the controller to at least some of the plurality of stateless network devices.

In another aspect, a DDoS attack mitigation system includes a plurality of stateless network devices connected to a network. The DDoS attack mitigation system also includes one or more DPI devices connected to the plurality of stateless network devices. Each of the DPI devices is configured to detect a DDoS attack. The DDoS attack mitigation system further includes a controller connected to the plurality of stateless network devices and connected to the one or more DPI devices. The controller includes logic integrated with and/or executable by a processor. The controller is configured and operable to receive a signal from a first DPI device of the one or more DPI devices and analyze the received signal. The controller is further configured and operable to update a network traffic policy to redirect at least some of network traffic destined for the first DPI device to one or more DPI devices different from the first DPI device based on the analyzed signal and to send a signal indicative of the updated network policy to at least some of the plurality of stateless network devices.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
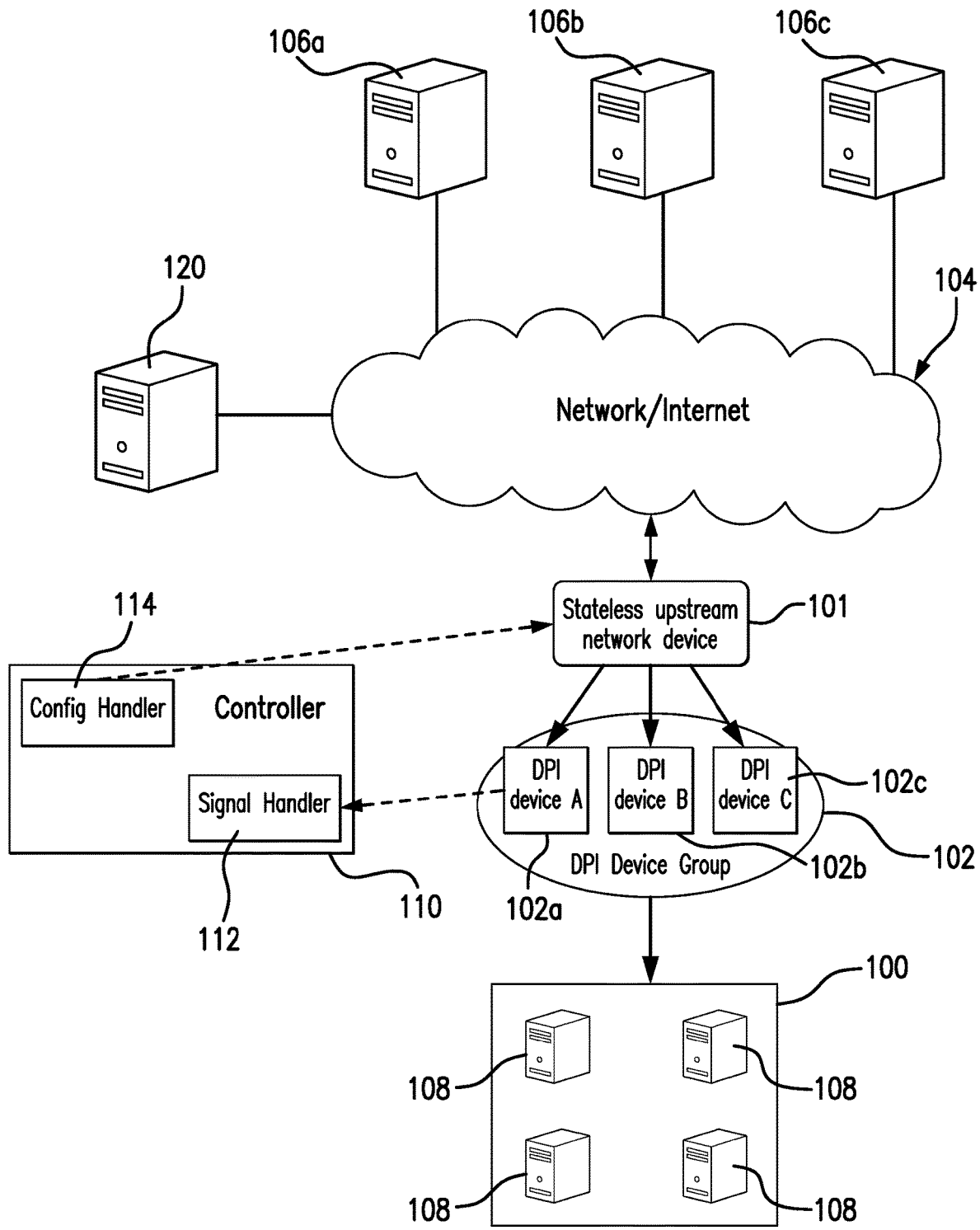
FIG. 1 is a schematic diagram showing network architecture and the relationship between a DPI device group and protected network according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present invention describe a system, apparatus and method for avoiding and mitigating the harmful effects of a DDoS attack on a computer system/device or network.

Turning now descriptively to the drawings, in which similar reference characters denote similar elements throughout the several views, FIG. 1 illustrates the relationship between the protected network 100, stateless upstream network devices 101, attack mitigating DPI device group 102, a controller 110 of the DPI device group, Internet 104, and external host devices 106a, 106b . . . 106n.

In a typical implementation, the external host devices 106a, 106b . . . 106n (also referred to as external devices or host devices) attempt to connect to protected devices 108 within the protected network 100 typically via a private network or a public computer network such as the Internet 104. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a group of distributed DPI devices 102a-102c preferably located between the Internet 104 and the protected network 100. In one embodiment, the device group 102 may comprise a first DPI device 102a, second DPI device 102b and a third DPI device 102c, which act in unison. In FIG. 1, the DPI devices 102a-102c are able to connect to devices within different networks (e.g., Internet) through stateless upstream communication devices 101 such as hubs, switches, and routers. In various embodiments, the DPI devices 102a-102c can receive and inspect the same plurality of traffic flows received at the stateless upstream communication devices 101. Usually, the protected network 100 is an enterprise network, such as a school network, business network, and government network, to list a few examples. In other embodiments, the DPI device group 102 is located within the Internet, service provider network or enterprise network rather than as a network edge as illustrated. It is to be appreciated that when deployed within the protected network, traffic is diverted to the distributed group of DPI devices 102.

DPI is a form of network packet filtering, and may be used for many different purposes. A message sent from one computing device to another takes the form of one or more packets. These packets may be forwarded amongst and/or between any number of intermediate devices before they reach their destination(s). DPI involves inspecting the contents of these packets at an inspection point. An inspection point may be any device in the path from the sending device/starting point to the receiving device/end point. Each of the DPI devices 102a-102c depicted in FIG. 1 comprises an inspection point. In some embodiments, the inspection point may be a DPI device that is not a direct part of the path the messages travels. For example, if a message travels from an external host device 106a to a stateless network device 101 to one of the protected devices 108, the stateless upstream network device 101 may send the message to one of the devices in the device group 102 for DPI.

In one or more embodiments, each device in the group 102 includes functionality for performing DPI. The DPI may be performed in any manner now known or later developed. Primarily, DPI is deployed to allow policies to be aware of (i.e. take account of) layer 7 (the application layer) of the OSI network stack. However, other equipment can be used to apply policies at lower layers (e.g., layer 4, the transport layer). For example, an IP router is able to apply policies to restrict or block traffic matching certain patterns (e.g., certain blocks of IP addresses) from entering the network. IP routers are also able to account for the volume of traffic to/from different IP addresses. Thus, in various embodiments of the invention, the DPI technology can protect a network from deliberate attacks, by monitoring, identifying, and throttling traffic at all layers of the Open Systems Interconnect (OSI) model. Specifically, the DPI devices 102 may be configured to identify unusual traffic flows, such as DDoS attacks, certain forms of malware (e.g., worms, backdoors), and policy violations (e.g., a client system providing network services to other systems). In one or more embodiments of the invention, more than one packet may be required to properly classify a particular traffic flow. For example, it may take 2 packets to identify that a particular connection to a server is a DDoS attack. It will be apparent to one of ordinary skill in the art that any number of packets may be required to properly classify a particular unusual traffic flow to a protected device/network and, as such, embodiments of the present invention should not be limited to the above example.

In a typical implementation, DPI devices 102a-102c authenticate all external host devices 106a, 106b . . . 106n before allowing the external devices to access the protected devices 108 within the protected network 100.

To protect against DDoS attacks, the DPI devices 102a-102c distinguish between requests from legitimate hosts 106a-106n and attack traffic from attacking host 120 by performing some form of DPI analysis procedure. Advantageously, the DPI devices 102a-102c can perform the DPI analysis either on live or stored data. In either case, the results of such DPI analysis enable the DPI device group 102 to provide sophisticated attack protection services such as blocking packets matching the detected patterns in attack traffic, either in a manual or automated fashion. The DPI device group 102 can also perform pattern detection analysis on the packet payload, to immediately detect, for example, a particular application specific malicious attack pattern.

Furthermore, stateless upstream network communication devices, such as stateless routers and/or switches 101, collect flow information from the packet information that is transmitted between the protected network 100 and other networks 104. Flow information may also be collected, in some examples from packet monitors or taps (not shown in FIG. 1) that are installed usually solely to monitor packet traffic.

It should be noted the exemplary embodiment illustrated in FIG. 1 may be carried out in a SDN-based system. In SDN architecture, the control plane conventionally used for communication networks is decoupled from the data plane, thus allowing services to be managed abstractly and in a centralized manner. Network intelligence and state can be logically centralized, and the underlying network infrastructure can be abstracted from the executing applications. As a result, communication network carriers can gain enhanced programmability, automation, and network control, enabling them to build highly scalable, flexible networks that readily adapt to changing needs. Typically, a SDN includes a software layer consisting of an application and a hardware layer consisting of a hardware abstraction layer and hardware.

OpenFlow is an example of a SDN protocol. OpenFlow protocol provides a common communication protocol between SDN controllers and other network devices. The OpenFlow protocol describes message exchanges that take place between an OpenFlow controller and one or more OpenFlow switches. Commands or messages used by the OpenFlow protocol may be extended to include new commands or messages that are compatible with the protocol. In FIG. 1, the protected network 100 is interconnected with other networks 104 by means of a SDN-enabled switch 101 and a SDN-enabled controller 110 for controlling it. The SDN-enabled controller 110 (referred to hereinafter as simply "controller") provides flow control information (an output port, QoS, etc.) for handling received packets. The plurality of DPI devices 102a-102c within the DPI device group 102 can send flow data to its controller 110, and enable the controller 110 to use various network protocols to keep load evenly distributed across the DPI devices 102a-102c. The stateless SDN-enabled switch 101 (referred to hereinafter as simply switch) handles packets based on the flow control information provided from the controller 110.

Typically, a SDN-enabled switch has a table (not shown in FIG. 1) for storing the flow control information. Upon receiving a packet corresponding to a flow stored in such table, the switch 101 handles the packet according to the flow control information.

The controller 110 in the SDN environment implements control and management using software modules. The controller 110 may comprise some or all of the following components: a communication protocol signal handler 112 (OpenFlow protocol message handler or any other suitable protocol) and a configuration handler 114. In addition, in some approaches, the signal handler 112 may be configured to communicate with a Linux Kernel which may include one or more processing layers (e.g., a socket layer, a protocol layer, etc.) and a physical or virtual network interface card (NIC) driver, among other possible components and/or modules. The configuration handler 114 may determine a configuration for the switch 101 based on customer's policy. Accordingly, a service-related configuration may be maintained when a DPI service moves from one of the DPI devices in the group 102 to another. Of course, other components and/or modules may also be included in the switch controller architecture 110.

Advantageously, the embodiments disclosed herein offer a novel approach that can detect and mitigate a large-scale attack campaign where a vast number of attack tools participate in attacking the protected network 100. As discussed further below, the DPI device or group of devices 102 is configured to utilize existing configuration options, protocols and traffic shaping profiles to share network traffic load by signaling upstream networking equipment infrastructure to send traffic to another DPI device in the same device group. Furthermore, in some embodiments, this signal can also be used in conjunction with traffic policing to remedy oversubscription. Various types of traffic policing can be used, including rate limiting, packet blocking, packet dropping and/or intelligent discard for lower priority traffic, thusly making the disclosed technique more efficient in responding to distinct changes in attack patterns. In various embodiments, the disclosed technique enables the DPI device group 102 to fully automate load balancing, thereby reducing the time needed to detect and mitigate sophisticated attacks in fully automated mode and improve the overall user experience.

As illustrated in FIG. 1, the DPI device group 102 can provide entry points into the protected network 100. In alternative configuration, at least one of the devices in the DPI device group 102 may comprise a virtual device. In other words, at least some of the embodiments do not require the DPI devices 102a-102c to be physical hardware devices or to be located in a particular part of the network infrastructure, as long as the DPI devices 102a-102c can be in the path of the incoming traffic to the protected network 100.

Figure 2:
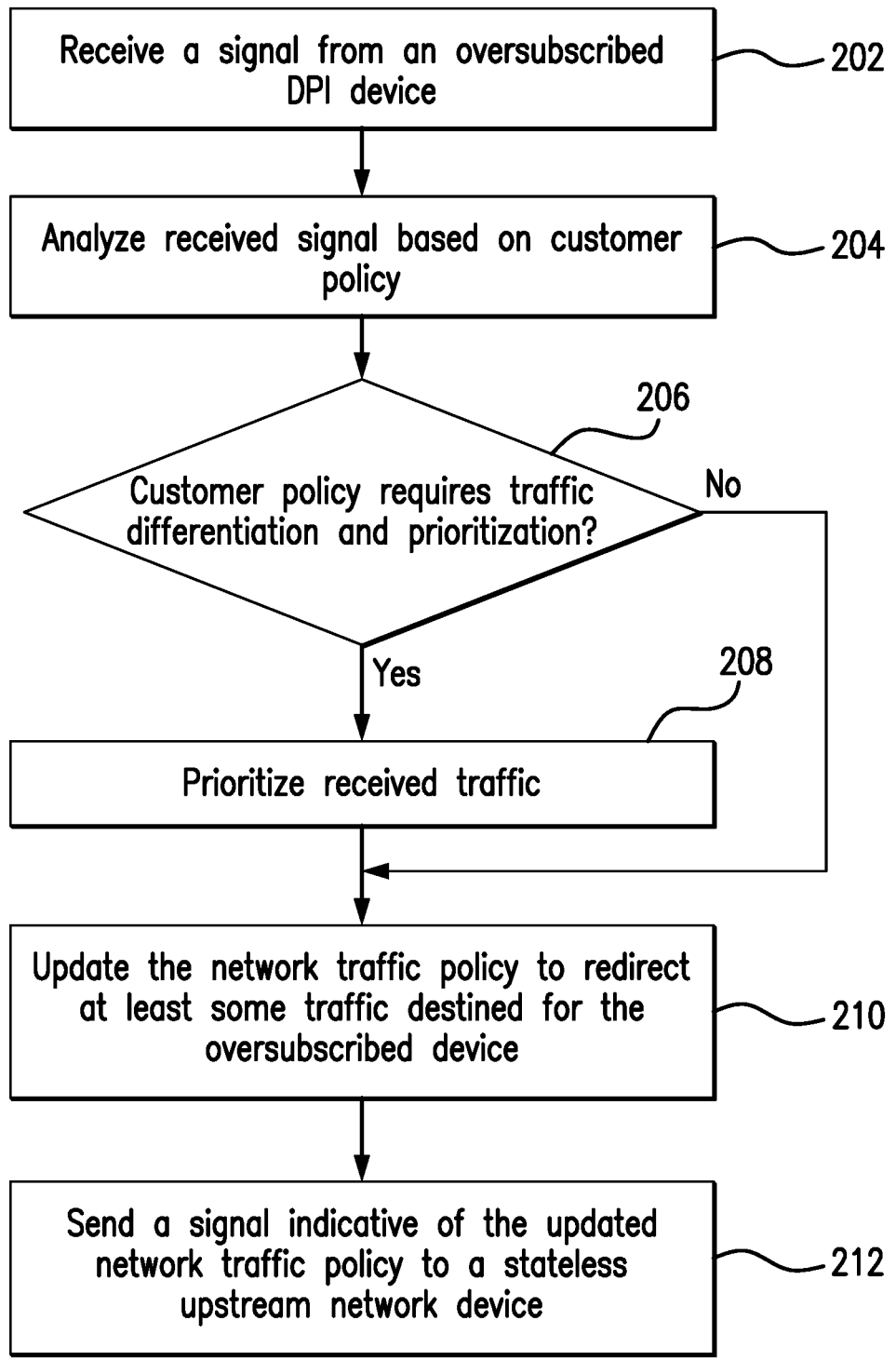
FIG. 2 is a flowchart illustrating a method for automatic handling of device group oversubscription, in accordance with the illustrated embodiments.

FIG. 2 is a flowchart illustrating a method for automatic handling of device group oversubscription in accordance with the illustrated embodiments. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

Various embodiments of the present invention contemplate an approach that automates the use of a stateless upstream network device, such as a router or a switch (e.g., SDN-enabled switch 101) to load balance or drop traffic destined for a DPI device or group of devices. Such stateless upstream network devices are preferably configured to exchange data packets with the public network 104, which may be an internal or external packet-based network such as the Internet. In one embodiment described below, to avoid oversubscription, when a DPI device (e.g., the first DPI device 102a) detects that it is oversubscribed, it is configured to send a signal to the controller 110 which, in turn, sends network policy changes to the stateless upstream network device 101 in order to reroute at least some of the network traffic destined for the oversubscribed device to another DPI device.

More specifically, at step 202, the controller 110 receives a stress signal/message from an oversubscribed DPI device. A DPI device is "oversubscribed" when its configured processing capacity is less than the processing capacity required to handle all received network traffic. The received signal may include multiple fields unique to the traffic flows that should be balanced to another DPI device. For example, this signal may include fields such as, time, date, IP address, user unique ID, unique traffic identifiers, a mitigation ID and the like. In some embodiments, the received control signal may be interpreted by the controller 110 as a command to drop lower priority traffic to reduce load on the oversubscribed device, as described below.

Next, at step 204, the controller 110 analyzes the received signal based on customer's network policy. Generally, a network policy may be used to control the traversal path used for the traffic based on performance and cost via path switch, load balancing, or plain routing, if the traffic is destined for the protected network 100. In other words, according to an embodiment of the present invention, at step 204, the controller 110 looks into customer's policy to determine how to handle the control signal indicative of oversubscription situation. For instance, if the control signal was received from the first DPI device 102a, the controller 110 evaluates customer's policy to determine whether to redirect at least a portion of the traffic destined for the first device 102a to a second 102b or a third 102c DPI devices, whether to drop lower priority traffic defined by customer, etc.

Next, at step 206, the controller 110 determines whether customer's policy requires traffic differentiation and prioritization. For example, techniques disclosed herein for protecting DPI processing capacity can aggregate across multiple DPI devices 102a-102c to facilitate differential control of DPI processing services to protect the overall network capacity. It should be noted that in some embodiments, the controller 110 may use a differential traffic control policy list to determine whether or not to apply a differential traffic control policy to a DPI device requesting network traffic load re-balancing.

In response to determining that customer's policy requires traffic prioritization (decision block 206, "yes" branch), at step 208, the controller 110 prioritizes the received upstream data traffic. Upstream data may be prioritized and forwarded at any level of granularity desired, such as on a packet-by-packet basis or a frame-by-frame basis. A first subset of upstream data received at the stateless upstream network device 101 may be forwarded to the second DPI device 102b according to a first policy via the normal upstream network flow, and a second subset of upstream data received at the stateless upstream network device 101 may be forwarded to the first DPI device 102a according to a second policy via the priority upstream network flow. Thus, data packets may be forwarded to the DPI devices 102a-102c in an order that depends upon their relative priorities. For example, a particular policy may prioritize a higher-paying customer's traffic, so that if one or more DPI devices 102a-102c are being oversubscribed, such DPI devices may signal the upstream devices (such as SDN-enabled switch 101) to drop lower priority traffic automatically. Advantageously, this technique may increase revenue for some customers selling a managed DDoS solution or allow them to expand their services.

According to an embodiment of the present invention, at step 210, after prioritizing the upstream data traffic or in response to determining that customer's policy requires neither traffic differentiation nor traffic prioritization (decision block 206, "No" branch), the controller 110 may update the network traffic policy to redirect at least some network traffic destined for the one or more oversubscribed devices.

In one embodiment, the desired policy changes can be implemented by the configuration handler module 114, which may use one or more pre-programmed plugins. The use of plugins simplifies the implementation of the configuration handler module 114. However, it should be appreciated that the techniques described herein are not limited to implementing a controller using plugins, and that other techniques can be employed to enable a user to implement policies that evaluate load balancing and traffic prioritization requirements. In various embodiments, the configuration handler module 114 of the controller 110 may use any suitable protocol to configure the stateless upstream device 101 in an upstream flow. For example, the configuration handler 114 may use BGP FlowSpec based "Multidimensional Route Distribution" standard to define a percentage of upstream network data segment that should be routed to another DPI device. As another non-limiting example, the SDN-enabled controller 110 may send OpenFlow commands to stateless upstream network device 101, which is remotely controllable, in order to drop an appropriate upstream network data segment. Advantageously, the controller 110 may include a UI module (not shown in FIG. 1) that provides a unified user interface and that allows a user to configure settings of the configuration handler module 114 in order to control how the upstream traffic is distributed. While the system depicted in FIG. 1 illustrates a single switch 101, the system can have a plurality of switches, routers, bridges, wireless routers, hubs, cable modems, digital subscriber line (DSL) modems or the like that are arranged in some hierarchical fashion in order to appropriately route traffic to and from the protected network 100.

At step 212, the controller 110 may automatically send a signal/request indicative of the updated network traffic policy to one or more intermediary stateless upstream network devices 101. The intermediary stateless upstream device 101 receives the signal/request comprising one or more commands and/or configuration sent by the configuration handler module 114 of the controller 110 and executes the one or more commands/configuration to implement the desired policy. Further, in one embodiment, to achieve oversubscription sensitive load balancing between DPI devices, this signal/request may include multiple fields unique to the traffic flows that should be balanced from the oversubscribed DPI device to another DPI device.

Figure 3:
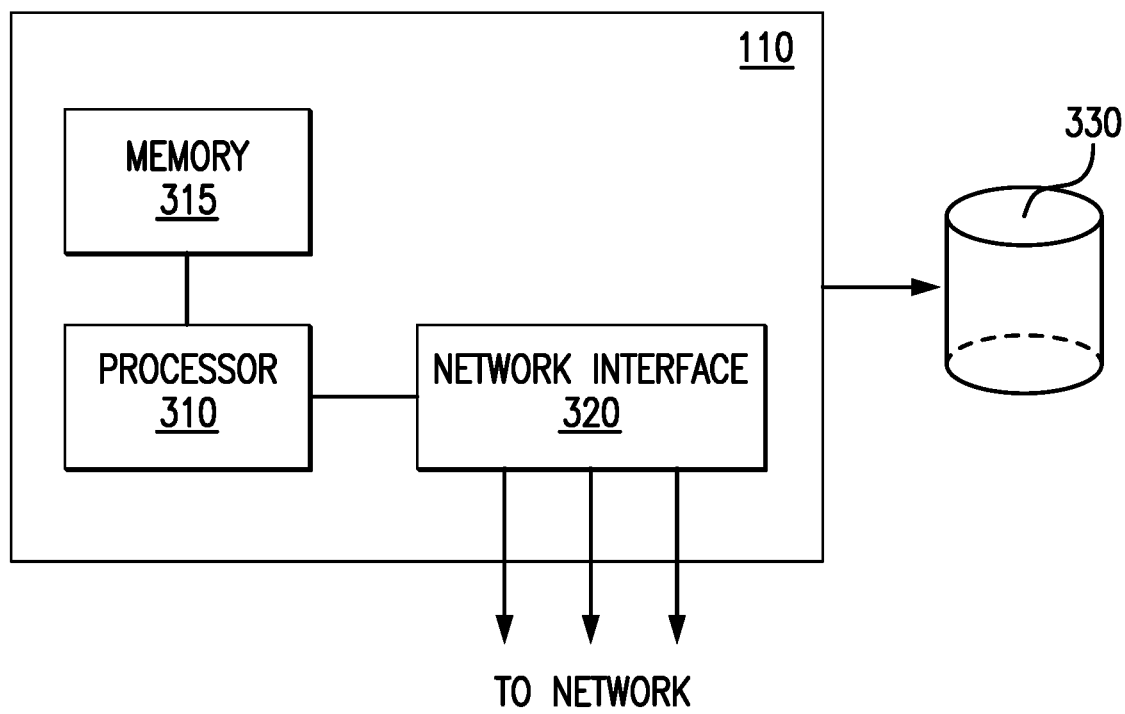
FIG. 3 is a block diagram of the controller of FIG. 1, in accordance with an embodiment of the present invention.

With reference now to FIG. 3, illustrated is an exemplary and non-limiting block diagram of the controller 110 constructed according to an illustrated embodiment. The controller 110 is communicatively coupled to the protected network 100 and to the database 330 (i.e., storage medium storing updated network traffic policy information), as shown in FIG. 3, and is at least configured to execute the method for mitigating network attacks as described in greater detail above. The controller 110 preferably includes a processor 310 coupled to a memory 315 and a network-interface module 320. The network-interface module 320 allows the communication with the protected network 100. The processor 310 uses instructions stored in the memory 315 to execute attack detection tasks as well as to control and enable the operation of the network-interface module 320.

In summary, various embodiments of the present invention disclose a novel approach to automate load balancing of monitored traffic flows. In one embodiment, this approach enables clients to work in a plugin fashion and to utilize a variety of desirable network protocols (e.g., an OpenFlow protocol) or methods to achieve the load balancing. The disclosed approach provides a number of advantages. In one aspect, the disclosed approach applies network policy changes to one or more stateless network devices upstream of the oversubscribed DPI device, such as a router or switch. Conventional implementations of security functionality at the load balancer level require state information and therefore are susceptible to DDoS attack. In contrast, the DPI flow processing facility disclosed by various embodiments of the present invention may use a set of stateless devices, which would not fall victim to the DDoS attacks themselves, therefore being useful in distributing load across multiple DPI devices 102a-102c. In another aspect, the disclosed automated load balancing and DPI processing functionality performed by the disclosed dynamically modified DPI flow processing facility may help customers fully utilize their DDoS scrubbing capacity and may enable seamless addition or removal capacity, while the controller 110 uses one or more signals in distributing load across the plurality of DPI devices 102a-102c.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A distributed denial of service (DDoS) attack mitigation system comprising:
a plurality of stateless network devices connected to a network; a plurality of Deep Packet Inspection (DPI) devices connected to one or more of the plurality of stateless network devices, each of the plurality of DPI devices configured to detect a DDoS attack and further configured to detect on over-subscription condition caused by a flow of network traffic thereto so as to generate and transmit an over-subscription signal;
a controller connected to one or more of the plurality of stateless network devices and connected to the plurality of DPI devices, the controller comprising logic integrated with or executable by a processor, the logic being configured to;
receive an over-subscription signal from a first DPI device of the one or more DPI devices;
analyze the over-subscription signal received from the first DPI device; update a network traffic policy;
send the updated network policy to the plurality of stateless network devices;
send the updated network policy from the plurality of stateless network devices to the plurality of DPI devices;
based the updated network policy:
either i) redirecting at least some of network traffic destined for the first DPI device to one of the plurality of DPI devices different from the first DPI device based upon customer priority prescribed in the network traffic policy associated with network traffic to be diverted to another DPI device;
or ii) dropping lower network traffic to the first DPI device based on the analyzed over-subscription signal; and
send a signal indicative of the updated network policy to at least some of the plurality of stateless network devices to achieve load-balancing of the network traffic flowing to the one or more DPI devices.

2. The system of claim 1, wherein each of the plurality of stateless network devices comprises at least one of a wireless router, a hub, a switch, a router, a cable modem, a digital subscriber line (DSL) modem, and the like.

3. The system of claim 1, wherein the over-subscription signal includes network traffic information identifying at least one network traffic flow destined for the first DPI device.

4. The system of claim 3, wherein network traffic flows have at least two priority levels and wherein the identified at least one network traffic flow comprises a low priority traffic flow.

5. A distributed denial of service (DDoS) attack mitigation system comprising:
a plurality of stateless network devices connected to a network; a plurality of Deep Packet Inspection (DPI) devices connected to one or more of the plurality of stateless network devices, each of the plurality of DPI devices configured to detect a DDoS attack and further configured to detect on over-subscription condition caused by a flow of network traffic thereto so as to generate and transmit an over-subscription signal;

a software defined network (SDN) controller connected to one or more of the plurality of stateless network devices and connected to the plurality of DPI devices, the SDN controller comprising logic integrated with and/or executable by a processor, the logic being configured to:

receive an over-subscription signal from a first DPI device of the one or more DPI devices;

analyze the over-subscription signal received from the first DPI device;

update a network traffic policy;

send the updated network policy to the plurality of stateless network devices;

send the updated network policy from the plurality of stateless network devices to the plurality of DPI devices, based the updated network policy:

either i) redirecting at least some of network traffic destined for the first DPI device to one of the plurality of DPI devices different from the first DPI device based upon customer priority prescribed in the network traffic policy associated with network traffic to be diverted to another DPI device;

or ii) dropping lower network traffic to the first DPI device based on the analyzed over-subscription signal; and send a signal indicative of the updated network policy to at least some of the plurality of stateless network devices to achieve load-bola acing of the network traffic flowing to the one or more DPI devices.

6. The system of claim 5, wherein the SDN protocol signal operates in accordance with OpenFlow.

7. The system of claim 5, wherein the logic of the SDN controller is further configured to update the network policy based on user-specified re-routing criteria.

8. The system of claim 5, wherein the SDN protocol signal reconfigures the at least some of the plurality of stateless network devices with the updated network traffic policy or other configuration information.

9. A method for automatic handling of device group oversubscription, the method comprising steps of:

receiving, by a controller, an over-subscription signal from a first DPI device of a plurality of DPI devices, wherein the controller is connected to one or more of a plurality of stateless network devices and connected to the plurality of DPI devices;

analyzing, by the controller, the over-subscription signal received from the first DPI device;

updating, by the controller, a network traffic policy;

sending the updated network policy to the plurality of stateless network devices;

sending the updated network policy from the plurality of stateless network devices to the plurality of DPI devices;

based the updated network policy:

either i) redirecting at least some of network traffic destined for the first DPI device to one of the plurality of DPI devices different from the first DPI device update a network traffic policy to either i) redirecting at least some of network traffic destined for the first DPI device to the one or more DPI devices different from the first DPI device based upon customer priority prescribed in the network traffic policy associated with network traffic to be diverted to another DPI device or ii) dropping lower network traffic to the first DPI device based on the analyzed over-subscription signal; or ii) dropping lower network traffic to the first DPI device based on the analyzed over-subscription signal; and sending, by the controller, a signal indicative of the updated network policy to at least some of the plurality of stateless network devices to achieve load-balancing of the network traffic flowing to the one or more DPI devices.

10. The method of claim 9, wherein each of the plurality of stateless network devices comprises at least one of a wireless router, a hub, a switch, a router, a cable modem, a digital subscriber line (DSL) modem, and the like.

11. The method of claim 9, further comprising detecting an over-subscription condition by the first DPI device prior to sending the signal to the controller.

12. The method of claim 9, wherein the over-subscription signal includes network traffic information identifying at least one network traffic flow destined for the first DPI device.

13. The method of claim 12, wherein network traffic flows have at least two priority levels and wherein the identified at least one network traffic flow comprises a low priority traffic flow.

14. The method of claim 9, wherein the controller comprises a software defined network (SDN) controller and wherein the signal comprises a SDN protocol signal.

15. The method of claim 14, wherein the SDN protocol signal operates in accordance with OpenFlow.

16. The method of claim 14, wherein the step of updating the network traffic policy further comprises updating the network policy based on user-specified re-routing criteria.

17. The method of claim 14, further comprising the step of reconfiguring, via the SDN protocol signal, at least some of the plurality of stateless network devices with the updated network traffic policy or other configuration information.

* * * * *